(12) United States Patent
Zhang et al.

(10) Patent No.: US 12,492,996 B2
(45) Date of Patent: Dec. 9, 2025

(54) VISUAL DETECTION LIGHT SOURCE AND TAB DETECTION EQUIPMENT

(71) Applicant: CONTEMPORARY AMPEREX TECHNOLOGY (HONG KONG) LIMITED, Hong Kong (CN)

(72) Inventors: Zhipeng Zhang, Ningde (CN); Yuyang Mao, Ningde (CN); Ping Jiang, Ningde (CN); Yong Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 195 days.

(21) Appl. No.: 18/349,731

(22) Filed: Jul. 10, 2023

(65) Prior Publication Data
US 2024/0167963 A1 May 23, 2024

Related U.S. Application Data

(63) Continuation of application No. PCT/CN2023/084765, filed on Mar. 29, 2023.

(30) Foreign Application Priority Data

Nov. 22, 2022 (CN) .......................... 202223104874.0

(51) Int. Cl.
*G01N 21/88* (2006.01)
*G01N 21/84* (2006.01)

(52) U.S. Cl.
CPC ..... *G01N 21/8806* (2013.01); *G01N 21/8803* (2013.01); *G01N 2021/845* (2013.01)

(58) Field of Classification Search
CPC .................... G01N 21/8806; G01N 21/8803
See application file for complete search history.

(56) References Cited

U.S. PATENT DOCUMENTS

| 12,085,274 B1 * | 9/2024 | Spiro ..................... F21S 8/061 |
| 2010/0246174 A1 | 9/2010 | Ido et al. |

(Continued)

FOREIGN PATENT DOCUMENTS

| CN | 207992073 U | 10/2018 |
| CN | 209764743 U | 12/2019 |

(Continued)

OTHER PUBLICATIONS

Extended European Search Report for Application No. 23734439.5, mailed on Jul. 18, 2024, 56 pages.

(Continued)

*Primary Examiner* — Christopher E Dunay
(74) *Attorney, Agent, or Firm* — Ladas & Parry LLP

(57) ABSTRACT

A visual detection light source and tab detection equipment are described. The visual detection light source is configured to irradiate a side face of a tab portion, and includes a main light source and a supplementary light source; the main light source and the supplementary light source are arc-shaped light sources, the main light source and the supplementary light source are disposed concentrically, and the main light source is disposed outside the supplementary light source; the main light source is configured to irradiate the side face of the tab portion at an inclined irradiation angle; and the supplementary light source is configured to vertically irradiate the side face of the tab portion.

15 Claims, 10 Drawing Sheets

(56) References Cited

U.S. PATENT DOCUMENTS

| | | | |
|---|---|---|---|
| 2013/0223071 A1* | 8/2013 | Nishimori | G01N 21/89 |
| | | | 362/244 |
| 2017/0221193 A1 | 8/2017 | Park et al. | |
| 2021/0164920 A1* | 6/2021 | Liu | G01N 21/8806 |
| 2021/0236231 A1* | 8/2021 | Westenfelder, II | G01S 17/88 |
| 2021/0237355 A1* | 8/2021 | Cambron | B29C 64/118 |
| 2021/0285892 A1* | 9/2021 | Raj | G01B 11/022 |
| 2022/0130178 A1* | 4/2022 | Kujacznski | G01N 21/85 |

FOREIGN PATENT DOCUMENTS

| | | | |
|---|---|---|---|
| CN | 210347490 U | * | 4/2020 |
| CN | 111189838 A | | 5/2020 |
| CN | 213337371 U | | 6/2021 |
| CN | 114018931 A | | 2/2022 |
| CN | 216484667 U | | 5/2022 |
| CN | 216847530 U | | 6/2022 |
| CN | 216926606 U | | 7/2022 |
| CN | 216926607 U | | 7/2022 |
| CN | 217133520 U | | 8/2022 |
| CN | 217425232 U | | 9/2022 |
| KR | 20090110495 A | | 10/2009 |

OTHER PUBLICATIONS

Communication under Rule 71(3) for European Application No. 23734439.5, mailed Nov. 28, 2024, 43 pages.
International Search Report dated Jun. 27, 2023 for Application No. PCT/CN2023/084765.

* cited by examiner

VISUAL DETECTION LIGHT SOURCE AND TAB DETECTION EQUIPMENT

This application is a continuation of International application PCT/CN2023/084765 filed on Mar. 29, 2023 that claims priority to Chinese Patent Application No. 202223104874.0, filed with the Chinese Patent Office on Nov. 22, 2022. The content of these applications is incorporated herein by reference in its entirety.

TECHNICAL FIELD

This application relates to the field of batteries, in particular to a visual detection light source and tab detection equipment.

BACKGROUND

Energy saving and emission reduction are the key to sustainable development of automobiles, and electric vehicles have received extensive attention due to their advantage of environmental friendliness. A power battery is an important component of an electric vehicle.

A cell of the power battery is provided with tab portions. In the production process of the power battery, the tab portions generally need to be detected to identify a state of the tab portions. In a visual detection system, a light source is used for illuminating a target object to form an imaging effect most conducive to image processing, which is the core link of whether the object may be clearly observed. However, conventional light sources are generally unable to meet detection requirements of multilayer tabs, resulting in a poor detection effect of the tab portions.

SUMMARY

In view of this, embodiments of this application provide a visual detection light source and tab detection equipment to meet detection requirements of multilayer tabs and improve an detection effect of tab portions.

An embodiment of a first aspect of this application provides a visual detection light source configured to irradiate a side face of a tab portion. The visual detection light source includes a main light source and a supplementary light source, the main light source and the supplementary light source are arc-shaped light sources, the main light source and the supplementary light source are disposed concentrically, and the main light source is disposed outside the supplementary light source; the main light source is configured to irradiate the side face of the tab portion at an inclined irradiation angle, the inclined irradiation angle referring to an angle formed between a main direction of irradiation beams and a detected surface; and the supplementary light source is configured to vertically irradiate the side face of the tab portion.

The visual detection light source according to the above embodiment includes the arc-shaped main light source and the arc-shaped supplementary light source, the main light source and the supplementary light source are disposed concentrically, the main light source is configured to irradiate the side face of the tab portion at the inclined irradiation angle, and the supplementary light source is configured to vertically irradiate the side face of the tab portion. Thus, during detection, the main light source irradiates the tab portion laterally and annularly to eliminate shadows and fully illuminate a layer gap between tabs, and meanwhile the supplementary light source vertically irradiates the side face of the tab portion for light supplementing to ensure sufficient illumination. The main light source and the supplementary light source are arc-shaped light sources, and the arc-shaped light sources are evenly spaced from the tab portion. Thus, it may be seen that the visual detection light source according to the embodiment of this application may provide sufficient illumination for the multilayer tabs and may meet the detection requirements of the multilayer tabs, and the detection effect is improved.

In some embodiments, the inclined irradiation angle of the main light source ranges from 15° to 45°.

By setting the inclined irradiation angle of the main light source to range from 15° to 45°, high expression capacity for uneven surfaces is achieved, and unevenness of the tab portions may be detected.

In some embodiments, the inclined irradiation angle of the main light source is 30°.

By adoption of the above technical solution, the main light source may evenly irradiate the entire side face of the tab portion to eliminate shadows and fully illuminate the layer gap between the tabs.

In some embodiments, the main light source includes a first light holder, a first light-transmitting plate, and a plurality of first light beads, the first light-transmitting plate is assembled on the first light holder, the first light beads are disposed between the first light holder and the first light-transmitting plate, and the first light-transmitting plate is inclined inwards relative to the first light holder.

By adoption of the above technical solution, the main light source is an arc-shaped light source and may irradiate the side face of the tab portion at the inclined irradiation angle.

In some embodiments, an angle between a main direction of irradiation beams of the supplementary light source and the side face of the tab portion is 0° or 90°.

By adoption of the above technical solution, the setting angle of the supplementary light source may be set flexibly based on the tab portion to be detected. Since the supplementary light source is a vertical irradiation arc-shaped light source, the brightness of the side face of the tab portion may be improved.

In some embodiments, the supplementary light source includes a second light holder, a second light-transmitting plate, and a plurality of second light beads, the second light-transmitting plate is assembled on the second light holder, the second light beads are disposed between the second light holder and the second light-transmitting plate, and the second light-transmitting plate is parallel to a rear cover surface of the second light holder.

By adoption of the above technical solution, the supplementary light source is a vertical irradiation light source and may supplement light for the detected tab portion.

In some embodiments, the visual detection light source further includes a bracket, the main light source and the supplementary light source being movably disposed on the bracket.

By adoption of the above technical solution, the main light source and the supplementary light source are movably disposed on the bracket, so that a working distance of the main light source and the supplementary light source is conveniently adjusted to adapt to detection requirements of cells of different sizes.

An embodiment of a second aspect of this application provides tab detection equipment configured to detect a first tab portion and a second tab portion on a cell. The tab detection equipment includes:

a first visual detection light source, configured to irradiate an inner side face of the first tab portion;

a second visual detection light source, configured to irradiate an outer side face of the second tab portion;

a third visual detection light source, configured to irradiate an outer side face of the first tab portion; and a fourth visual detection light source, configured to irradiate an inner side face of the second tab portion, where the first visual detection light source, the second visual detection light source, the third visual detection light source and the fourth visual detection light source are spaced apart, and at least one of the first visual detection light source, the second visual detection light source, the third visual detection light source and the fourth visual detection light source is the visual detection light source as described in the first aspect.

The above-mentioned tab detection equipment includes the four visual detection light sources to irradiate the inner side faces and the outer side faces of the two tab portions respectively, so that the tab detection equipment may comprehensively detect whether the two tab portions have defects. Based on the advantages of the visual detection light sources provided in the first aspect, the tab detection equipment may also be applicable to the requirements of detecting multilayer tabs, and the defection effect is improved.

In some embodiments, the first tab portion and the second tab portion are horizontally disposed and spaced apart along a first direction, and main light sources and supplementary light sources are disposed along a vertical direction.

By adoption of the above technical solution, the main light sources and the supplementary light sources may face toward the side faces of the tab portions, and it is convenient to dispose a visual camera above the tab portions along the vertical direction.

In some embodiments, light emitting surfaces of the supplementary light sources in the first visual detection light source and the fourth visual detection light source are disposed along the first direction and the vertical direction; and light emitting surfaces of the supplementary light sources in the second visual detection light source and the third visual detection light source are disposed along a second direction and the vertical direction, the second direction being perpendicular to the first direction.

By adoption of the above technical solution, the angles between the main direction of the irradiation beams of the supplementary light sources and the side faces of the tab portions are 0° or 90° to adapt to the different side faces of the tab portions.

In some embodiments, the first visual detection light source and the fourth visual detection light source are disposed in a mirroring manner, and the second visual detection light source and the third visual detection light source are disposed in a mirroring manner.

By adoption of the above technical solution, the first visual detection light source, the second visual detection light source, the third visual detection light source, and the fourth visual detection light source are disposed in sequence and arranged in a line, which facilitates conveying of cells and improves the detection efficiency.

In some embodiments, a visual detection light source mechanism further includes a light shading plate disposed between the second visual detection light source and the third visual detection light source, and the light shading plate is a non-transparent plate.

Since the second visual detection light source and the third visual detection light source are disposed in the mirroring manner, by disposing the light shading plate between the second visual detection light source and the third visual detection light source, mutual interference between the two light sources may be avoided, the second visual detection light source and the third visual detection light source may perform irradiation simultaneously, and the detection efficiency is improved.

In some embodiments, the light shading plate is a non-transparent plate subjected to matte black treatment.

By adoption of the above technical solution, the light shading plate may not only shade light, but also avoid light reflection, thereby preventing an imaging effect of the visual camera from being affected by reflected light.

In some embodiments, the visual detection light source mechanism further includes a drive member connected to the light shading plate, and the drive member is configured to drive the light shading plate to move along the second direction.

By adoption of the above technical solution, during detection, the light shading plate is placed to a position between the second visual detection light source and the third visual detection light source through the drive member to avoid mutual interference and influence on the imaging quality; and after detection, the light shading plate is removed from the position between the second visual detection light source and the third visual detection light source through the drive member to avoid obstructing conveying of the cell.

In some embodiments, the tab detection equipment further includes a conveying mechanism and a plurality of cell positioning tables disposed on the conveying mechanism, the conveying mechanism being configured to convey the cell positioning tables to allow the cell positioning tables to pass through the first visual detection light source, the second visual detection light source, the third visual detection light source and the fourth visual detection light source in sequence.

By adoption of the above technical solution, the conveying mechanism may drive the cell positioning tables and the cells to move, and the cells pass through the four tab detection mechanisms in sequence for detection of the inner side faces and the outer side faces of the first tab portion and the second tab portion, so that the detection efficiency is improved.

The above description is merely an overview of the technical solution of this application, which can be implemented according to the contents of the specification in order to enable the technical means of this application to be more clearly understood, and in order to enable the above and other objects, features and advantages of this application to be more clearly understood, specific implementations of this application are set forth below.

BRIEF DESCRIPTION OF DRAWINGS

In order to more clearly describe the technical solutions of the embodiments of this application, drawings that are to be referred for description of the embodiments or the conventional art will be briefly described hereinafter. Apparently, the drawings described hereinafter merely illustrate some embodiments of this application, and a person of ordinary skill in the art may also derive other drawings based on the drawings described herein without any creative effort.

Figure 1:
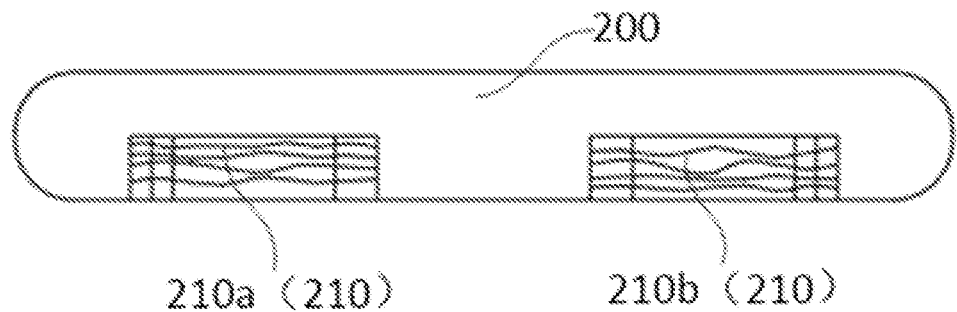
FIG. 1 is a front view of a cell according to an embodiment of this application.

The meanings of the reference numerals are:

100 denotes a visual detection light source; 100a denotes a first visual detection light source; 100b denotes a second visual detection light source; 100c denotes a third visual detection light source; 100d denotes a fourth visual detection light source; 10 denotes a main light source; 11 denotes a first light holder; 12 denotes a first light-transmitting plate; 13 denotes first light beads; 101 denotes a first light emitting surface; 102 denotes a surface to be detected; 20 denotes a supplementary light source; 21 denotes a second light holder; 22 denotes a first light-transmitting plate; 23 denotes second light beads; 201 denotes a second light emitting surface; 30 denotes a bracket; 40 denotes a light shading plate; 50 denotes a drive member; 1000 denotes tab detection equipment; 200 denotes a cell; 210 denotes tab portions; 210a denotes a first tab portion; 210b denotes a second tab portion; 300 denotes a conveying mechanism; and 310 denotes cell positioning tables.

DETAILED DESCRIPTION

Embodiments of the technical solutions of this application will be described in detail below in conjunction with the accompanying drawings. The following embodiments are provided only to more clearly illustrate the technical solutions of this application, and are therefore provided by way of example only, without limiting the scope of protection of this application.

Unless otherwise defined, all technical and scientific terms used herein have the same meaning as commonly understood by a person of ordinary skill in the art to which this application belongs. The terms used herein are merely for the purpose of describing specific embodiments but are not intended to be limiting of this application. The terms "comprise", "have" and any variation thereof in the description and claims of this application as well as the preceding brief description of the drawings are intended to cover a non-exclusive inclusion.

In the description of the embodiments of this application, the technical terms "first", "second" and the like are only used for distinguishing between different objects and are not to be understood as indicating or implying relative importance or implicitly indicating the quantity, a particular order or a primary-secondary relationship of the technical features indicated. In the description of the embodiments of this application, "a plurality of" means two or more, unless otherwise expressly and specifically limited.

Reference herein to "embodiment" means that particular features, structures, or characteristics described in connection with the embodiments may be included in at least one embodiment of this application. The appearances of the phrase in various places in the description are not necessarily all referring to the same embodiment, nor are separate or alternative embodiments mutually exclusive of other embodiments. It is to be expressly and implicitly understood by a person of ordinary skill in the art that the embodiments described herein may be combined with other embodiments.

In the description of the embodiments of this application, the term "and/or" is merely a description of an association relationship of associated objects, indicating that there may be three relationships, for example, A and/or B, which may mean: A alone, both A and B, and B alone. In addition, the character "I", as used herein, generally indicates an "or" relationship between the front and back associated objects.

In the description of the embodiments of this application, the term "a plurality of" refers to two or more (including two), similarly, "a plurality of groups" refers to two or more groups (including two groups), and "a plurality of pieces" refers to two or more pieces (including two pieces).

In the description of the embodiments of this application, the orientation or positional relationships indicated by the technical terms "center", "longitudinal", "transverse", "length", "width", "thickness", "upper", "lower", "front", "rear", "vertical", "horizontal", "top", "bottom", "inner", "outer", etc. are based on the orientation or positional relationships shown in the drawings, merely to facilitate the description of the embodiments of this application and simplify the description, and do not indicate or imply that the device or element referred to must have a particular orientation, be constructed and operated in a particular orientation, and thus should not be construed as limiting the embodiments of this application.

In the description of the embodiments of this application, unless otherwise expressly specified and limited, the technical terms "mounted", "connected", "connect", "fixed" and the like are to be understood in a broad sense, for example, it may be a fixed connection, or a detachable connection, or an integral connection; it may also be a mechanical connection or an electrical connection; and it may be a direct connection or indirect connection through an intermediate medium, and may be the communication between two elements or the interaction relationship between two elements. For a person of ordinary skill in the art, the specific meaning of the above-mentioned terms in the embodiments of this application may be understood according to specific circumstances.

At present, energy saving and emission reduction are the key to sustainable development of automobiles, and electric vehicles have received extensive attention due to their advantage of environmental friendliness. A power battery is an important component of an electric vehicle.

The power battery may include, but is not limited to, three forms: A battery cell, a battery module and a battery pack. The battery cell is the smallest unit that makes up a power battery, and generally includes a housing, a cover plate, a cell, a solution reservoir, and other functional components. In applications, a plurality of battery cells may be connected via an electrical connection structure and a fixing structure, and assembled into a battery in cooperation with a thermal management system, and the battery may be directly assembled on an electric device to provide electric energy for the electric device. Alternatively, a plurality of battery cells may be firstly assembled into a battery module via an electrical connection structure, a fixing structure, etc., and then a plurality of battery modules are assembled to the electric device in cooperation with the thermal management system to provide electric energy for the electric device. Alternatively, a plurality of battery modules and a thermal management system are incorporated into a case and assembled into a battery pack, and the battery pack is directly assembled on the electric device to supply electric power to the electric device.

The cell of the battery cell is provided with tab portions. The tab portions are metal conductors that lead out positive and negative electrodes from the cell, and one cell may have two tab portions extending out. The tab portions serve as contacts of a battery during charging and discharging, and the tab portions are usually multilayer tabs, that is, the tab portions include a plurality of stacked tabs.

In the production process of power batteries, the tab portions generally need to be detected to identify a state of the tab portions. For a multilayer tab, there is a gap between different tab layers, and the tab may be uneven. Conventional light sources may only meet the detection requirements of single-layer tabs, but may not meet the detection requirements of multilayer tabs, and the detection effect is poor.

In order to solve the problem, the inventor has designed a visual detection light source and a visual detection mechanism after intensive research. The visual detection light source includes an arc-shaped main light source and an arc-shaped supplementary light source. The main light source and the supplementary light source are disposed concentrically, and the main light source is configured to irradiate a side face of a tab portion at an inclined irradiation angle, the inclined irradiation angle referring to an angle formed between a main direction of irradiation beams and a detected surface. The supplementary light source is configured to vertically irradiate the side face of the tab portion. Thus, during detection, the main light source irradiates the tab portion laterally and annularly to eliminate shadows and fully illuminate a layer gap between tabs, and meanwhile the supplementary light source vertically irradiate the side face of the tab for light supplementing. Thus, it may be seen that the visual detection light source according to the embodiment of this application may provide sufficient illumination, has uniform light intensity, may meet the detection requirements of multilayer tabs, and improves the detection effect.

An embodiment of a first aspect of this application provides a visual detection light source. The visual detection light source is configured to irradiate a side face of a tab portion during detection.

Figure 2:
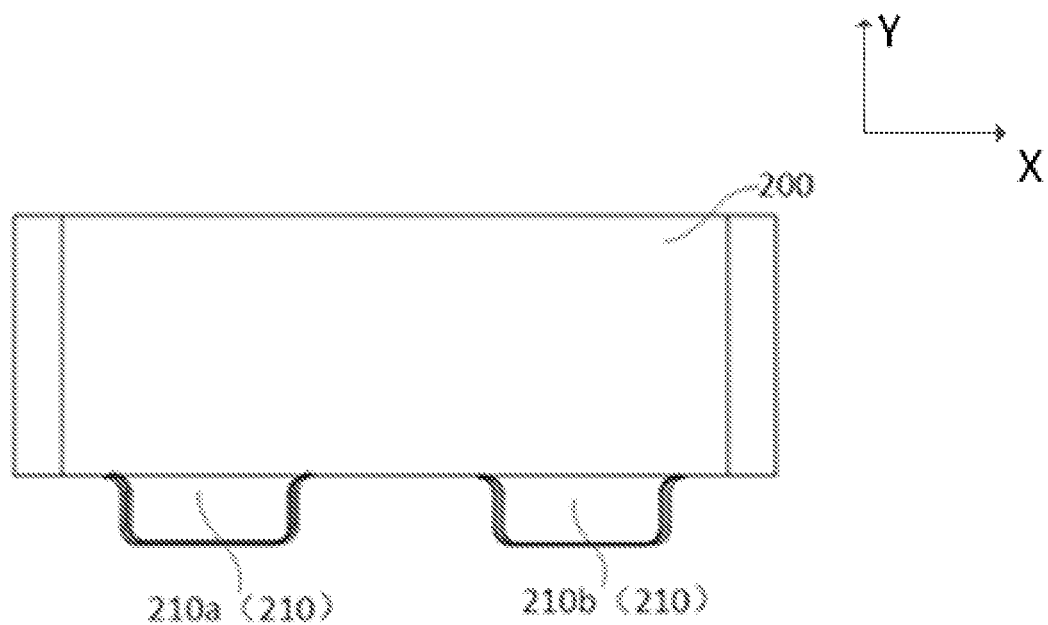
FIG. 2 is a top view of a cell according to an embodiment of this application.

FIG. 1 is a front view of a cell 200 according to an embodiment, and FIG. 2 is a top view of the cell 200 according to an embodiment. Referring to FIG. 1 and FIG. 2, the cell 200 is provided with two tab portions 210, and each of the tab portions 210 includes a plurality of tabs stacked along a thickness direction of the cell 200. In the cell 200 illustrated in FIG. 1, the plurality of tabs in each of the tab portions 210 are uneven; and in the cell 200 illustrated in FIG. 2, the plurality of tabs in each of the tab portions 210 are staggered, that is, the plurality of tabs are staggered in a length direction of the cell 200.

The two tab portions 210 are respectively a first tab portion 210a and a second tab portion 210b, where the first tab portion 210a is an anode tab, and the second tab portion 210b is a cathode tab.

The visual detection light source according to this application may be used for detecting the above-mentioned multilayer tabs, but is not limited thereto, and the visual detection light source may also detect single-layer tabs.

Figure 3:
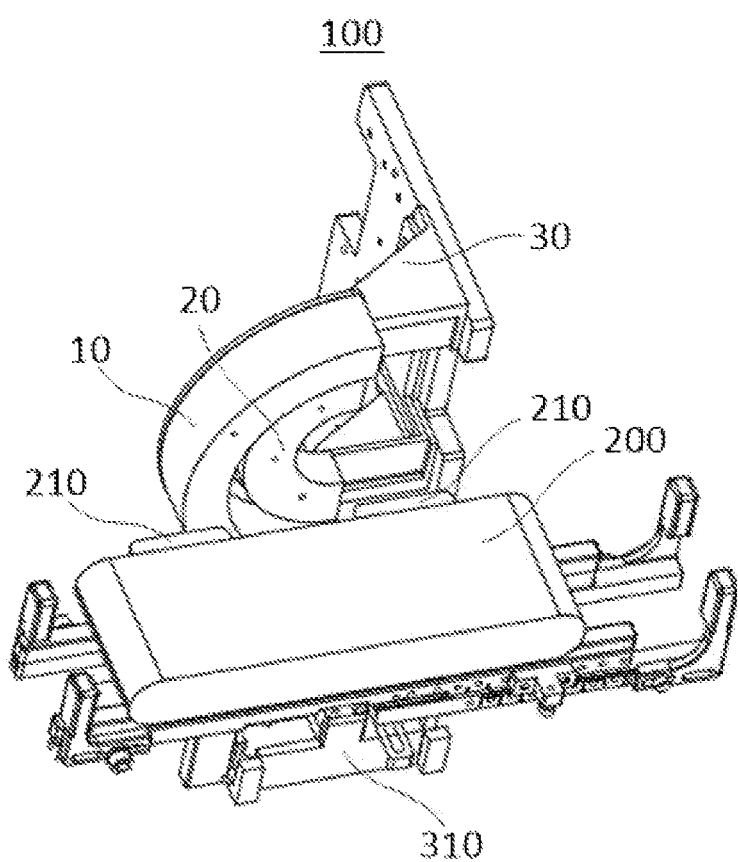
FIG. 3 is a schematic structural diagram of a visual detection light source and a cell according to an embodiment of this application.
Figure 4:
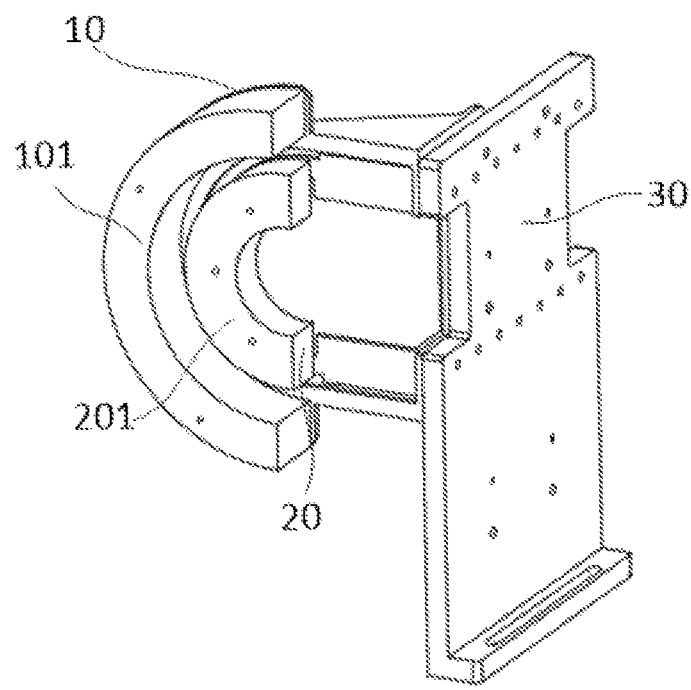
FIG. 4 is a schematic structural diagram of a visual detection light source according to an embodiment of this application.

Referring to FIG. 3 and FIG. 4, an embodiment of this application provides a visual detection light source 100 configured to irradiate a side face of the tab 210. The visual detection light source 100 includes a main light source 10 and a supplementary light source 20. The main light source 10 and the supplementary light source 20 are arc-shaped light sources. The main light source 10 and the supplementary light source 20 are disposed concentrically, and the main light source 10 is disposed outside the supplementary light source 20. The main light source 10 is configured to irradiate the side face of the tab portion at an inclined irradiation angle, the inclined irradiation angle referring to an angle formed between a main direction of irradiation beams and a detected surface. The supplementary light source 20 is configured to vertically irradiate the side face of the tab portion.

The visual detection light source 100 may be configured to detect an outer side face or an inner side face of the tab portion 210, where the outer side face of the tab portion 210 refers to a side face, away from the other tab portion 210, of the tab portion, and the inner side face of the tab portion 210 refers to a side face, close to the other tab portion 210, of the tab portion 210. In the embodiment shown in FIG. 3, the visual detection light source 100 is configured to detect the inner side face of the tab portion 210.

Since the main light source 10 and the supplementary light source 20 are arc-shaped light sources and are disposed concentrically, and the main light source 10 is disposed outside the supplementary light source 20, it may be understood that each of the main light source 10 and the supplementary light source 20 includes an outer arc surface and an inner arc surface, the inner arc surface of the main light source 10 is adjacent to the outer arc surface of the supplementary light source 20, and an inner diameter of the main light source 10 is larger than an outer diameter of the supplementary light source 20.

Figure 5:
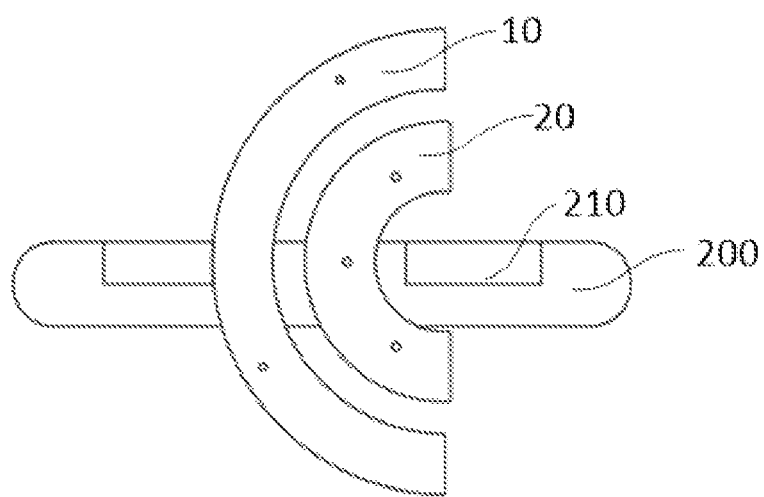
FIG. 5 is a side view of the visual detection light source and the cell shown in FIG. 3.
Figure 6:
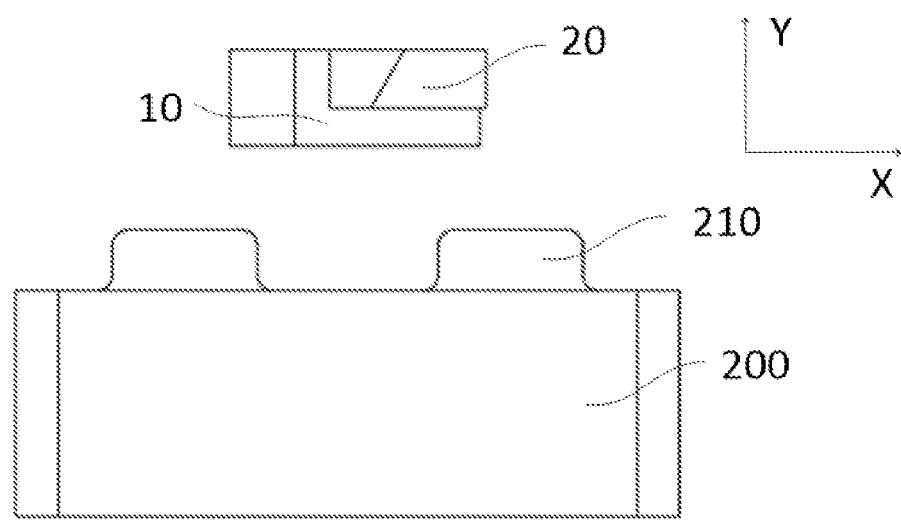
FIG. 6 is a top view of the visual detection light source and the cell shown in FIG. 3.

In the embodiment shown in FIG. 3, the cell 200 is placed horizontally on a cell positioning table 310, the two tab portions 210 are also placed horizontally, and the main light source 10 and the supplementary light source 20 are disposed along a vertical direction. From a side view shown in FIG. 5, the main light source 10 and the supplementary light source 20 are disposed between the two tab portions 210, and the inner arc surfaces of the main light source 10 and the supplementary light source 20 are disposed facing toward the tab portion 210. From a top view shown in FIG. 6, light emitting surfaces of the main light source 10 and the supplementary light source 20 face toward the tab portions 210 to be detected. It may be understood that when the cell 200 is placed vertically, the main light source 10 and the supplementary light source 20 may be placed horizontally so that both the main light source 10 and the supplementary light source 20 may irradiate the side face of the tab portion 210.

Referring to FIG. 3, FIG. 7 to FIG. 9, the main light source 10 has a certain irradiation angle, a surface 102 to be detected may be the side face of the tab portion 210, and the main light source 10 is configured to irradiate the side face of the tab portion 210 at an inclined irradiation angle a2, the inclined irradiation angle a2 referring to the angle formed between the main direction of the irradiation beams and the detected surface. Since the main light source 10 may not be disposed opposite to the side face of the tab, by adopting the arc-shaped light source with the certain inclined irradiation angle as the main light source 10, the tab portion 210 may be irradiated laterally and annularly, thereby eliminating shadows and fully illuminating the layer gap.

Figure 10:
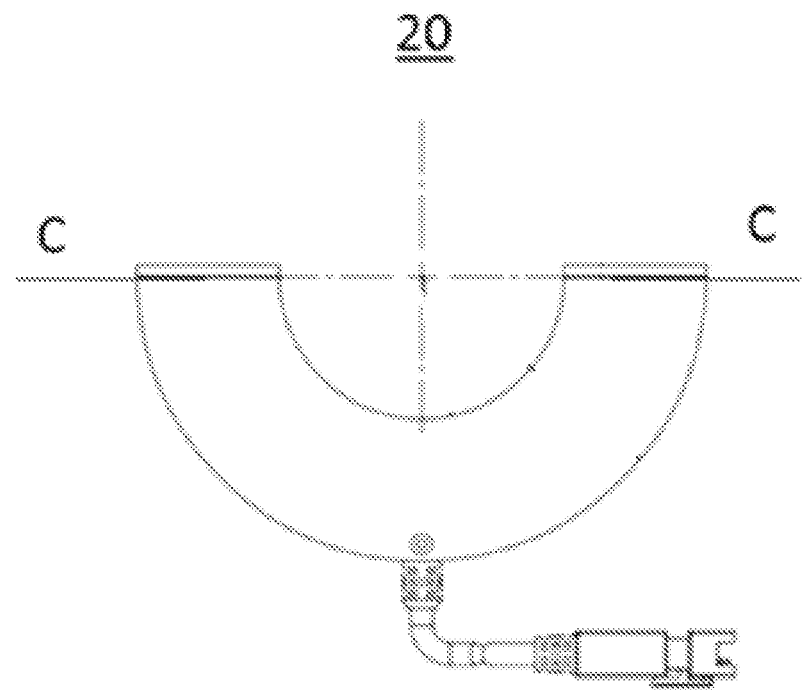
FIG. 10 is a schematic structural diagram of a supplementary light source according to an embodiment of this application.
Figure 11:
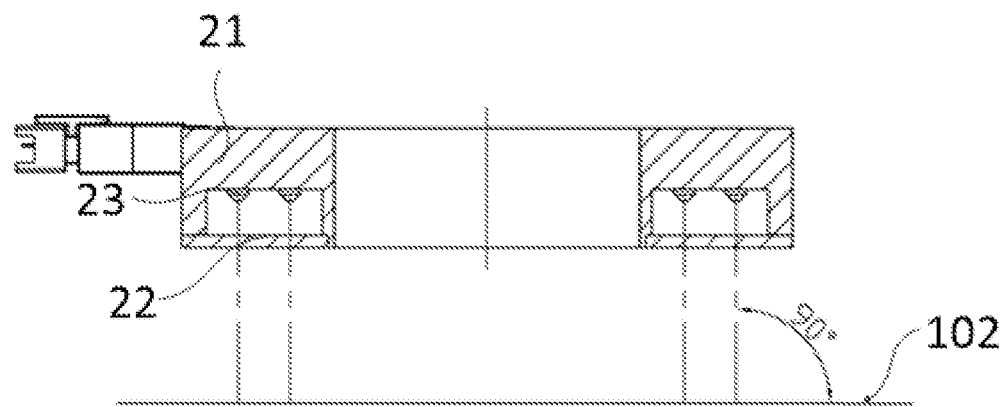
FIG. 11 is a cross-sectional view of the supplementary light source shown in FIG. 10 along a line C-C.

Referring to FIG. 3, FIG. 10 and FIG. 11, the supplementary light source 20 is a 0° vertical irradiation arc-shaped light source, and an angle formed between main beams of the supplementary light source 20 and the detected surface is 90° or 0°, so as to vertically irradiate the side face of the tab portion 210 for light supplementing.

The visual detection light source 100 according to the above embodiment includes the arc-shaped main light source 10 and the arc-shaped supplementary light source 20, the main light source 10 and the supplementary light source 20 are disposed concentrically, the main light source 10 is configured to irradiate the side face of the tab portion 210 at the inclined irradiation angle, and the supplementary light source 20 is configured to vertically irradiate the side face of the tab portion 210. Thus, during detection, the main light source 10 irradiates the tab portion 210 laterally and annularly to eliminate shadows and fully illuminate the layer gap between the tabs, and meanwhile the supplementary light source 20 vertically irradiates the side face of the tab portion for light supplementing to ensure sufficient illumination. The main light source 10 and the supplementary light source 20 are arc-shaped light sources, and the arc-shaped light sources are evenly spaced from the tab portion 210. Thus, it may be seen that the visual detection light source 100 according to the embodiment of this application may provide sufficient illumination for the multilayer tabs, may meet the detection requirements of the multilayer tabs, and improves the detection effect. By using the above-mentioned visual detection light source 100 and a visual camera for detection, whether the quantity of tabs is correct, whether the tabs are folded, whether the flatness of the multilayer tabs is qualified, and whether a staggering distance of the multilayer tabs is qualified may be detected.

Referring to FIG. 3, FIG. 4, FIG. 7 to FIG. 10 again, in some embodiments, the inclined irradiation angle a2 of the main light source 10 ranges from 15° to 45°.

The main light source 10 includes a first light holder 11, a first light-transmitting plate 12, and a plurality of first light beads 13. The first light-transmitting plate 12 is assembled on the first light holder 11. The first light beads 13 are disposed between the first light holder 11 and the first light-transmitting plate 12, and the first light beads 13 may be LED light beads. The main light source 10 has a first light emitting surface, and the first light emitting surface is an outer surface of the first light-transmitting plate 12. The main light source 10 is arc-shaped, and the first light-transmitting plate 12 is inclined inwards relative to the first light holder 11. The main light source 10 is an arc-shaped light source and may irradiate the side face of the tab portion at the inclined irradiation angle.

A rear cover surface of the first light holder 11 is flat, an angle between the first light-transmitting plate 12 and the rear cover surface is a1, and a1+a2=90°.

When the main light source 10 and the detected surface are placed horizontally, the inclined irradiation angle a2 is the angle formed between the main direction of the irradiation beams and the detected surface, and is also an angle between an axial direction of the first light beads 13 and a horizontal plane. In this case, the rear cover surface is also placed horizontally, and the angle a1 between the first light-transmitting plate 12 and the rear cover surface is also an angle between the first light-transmitting plate 12 and the horizontal plane. For example, if the inclined irradiation angle a2 is 30°, a1 is equal to 60°. In some prior art, an angle between the main direction of the beams and the vertical direction is defined as an irradiation angle of an arc-shaped light source, so for an arc-shaped light source with the inclined irradiation angle a2 of 30°, an angle between the main direction of the beams of the arc-shaped light source and the vertical direction is 60°, which may also be referred to as a "60° arc-shaped light source".

By setting the inclined irradiation angle a2 of the main light source 10 to range from 15° to 45°, high expression capacity for uneven surfaces is achieved, and unevenness of the tab portions 210 may be detected.

Figure 7:
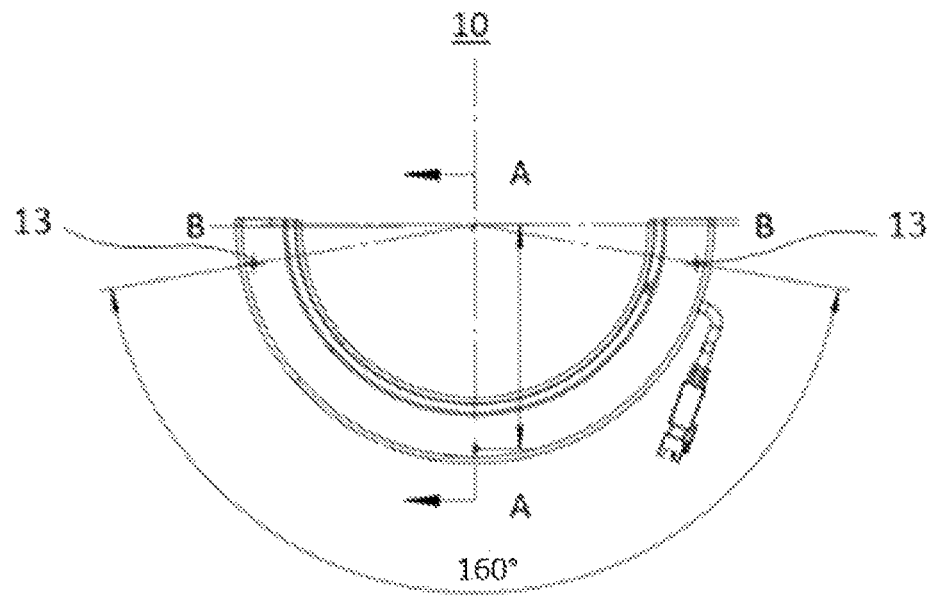
FIG. 7 is a schematic structural diagram of a main light source according to an embodiment of this application.
Figure 8:
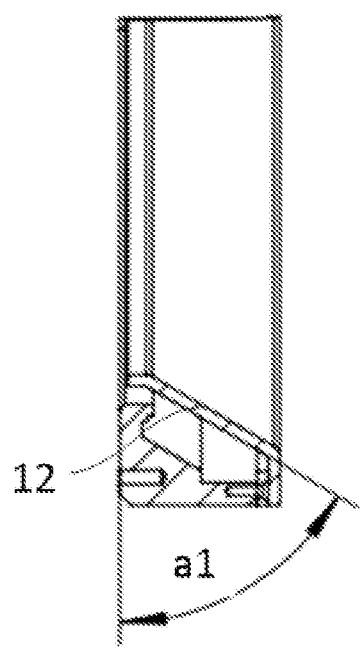
FIG. 8 is a cross-sectional view of the main light source shown in FIG. 7 along a line A-A.

In addition, as shown in FIG. 7, in some embodiments, an angle between connecting lines of two outermost first light beads 13 in the main light source 10 and the center of the circle of the main light source 10 respectively may be 160°, so that the entire side face of the tab portion 210 may be illuminated, and the cost is saved.

In some embodiments, the inclined irradiation angle a2 of the main light source 10 is 30°.

Figure 9:
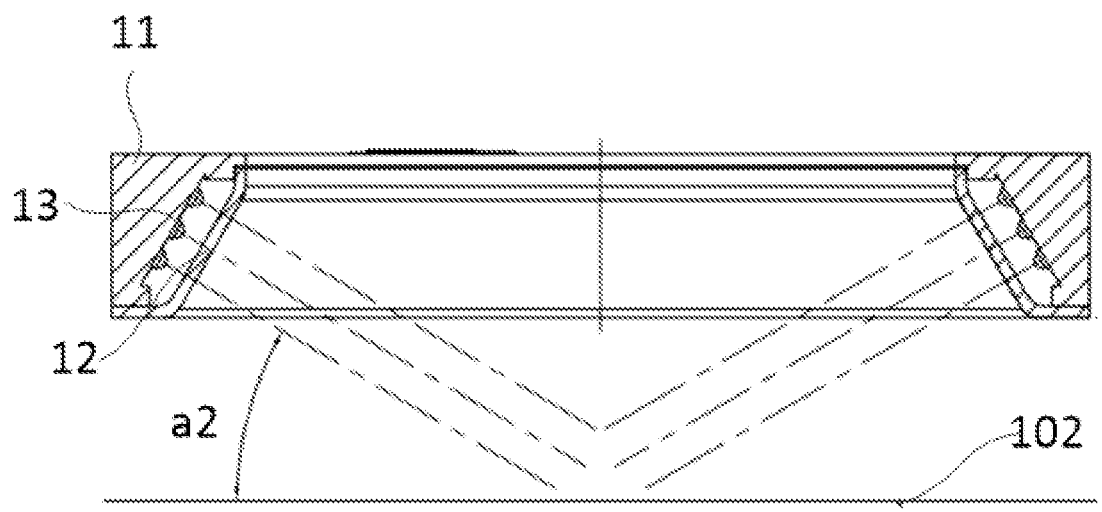
FIG. 9 is a cross-sectional view of the main light source shown in FIG. 7 along a line B-B.

As shown in FIG. 9, the inclined irradiation angle a2 of the main light source 10 is 30°, so that an angle between the main light source 10 and the side face of the tab portion 210 to be detected is 30°, the main light source 10 is a 60° arc-shaped light source, and the side face of the tab portion 210 needs to be located in the middle of a working distance of the 60° arc-shaped light source with the maximum illumination value.

By adoption of the above technical solution, the main light source 10 may evenly irradiate the entire side face of the tab portion 210 to eliminate shadows and fully illuminate the layer gap between the tabs.

In some embodiments, the angle between the main direction of the irradiation beams of the supplementary light source 20 and the side face of the tab portion 210 is 0° or 90°.

Referring to FIG. 3, FIG. 4, and FIG. 11, in one embodiment, the angle between the main direction of the irradiation beams of the supplementary light source 20 and the side face of the tab portion 210 is 0°.

The supplementary light source 20 includes a second light holder 21, a second light-transmitting plate 22, and a plurality of second light beads 23. The second light-transmitting plate 33 is assembled on the second light holder 21. The second light beads 23 are disposed between the second light holder 21 and the second light-transmitting plate 23, and the second light beads 23 may be LED light beads. The main light source 10 has a second light emitting surface 201, and the second light emitting surface 201 is an outer surface of the second light-transmitting plate 22. The supplementary light source 20 is arc-shaped, the second light-transmitting plate 22 is parallel to a rear cover surface of the second light holder 21, and the main direction (an axial direction of the light beads) of the irradiation beams is perpendicular to the second light emitting surface 201, that is, the supplementary light source 20 is a vertical irradiation light source. The side face of the tab portion 210 needs to be located in the middle of a working distance of the supplementary light source 20 with the maximum illumination value.

As shown in FIG. 3, in some embodiments, due to a small spacing between the two tab portions 210, the visual detection light source 100 may not be disposed between the two tab portions 210 to illuminate the inner side face of the tab portion 210, so that the main light source 10 and the supplementary light source 20 are both disposed facing toward the side face of the tab portion 210, and the angle between the supplementary light source 20 and the side face of the tab portion 210 is set as 0° for light supplementing. In other embodiments, if the outer side face of the tab portion 210 needs to be detected, the angle between the main direction of the irradiation beams of the supplementary light source 20 and the side face of the tab portion 210 may also be set as 90° for a better light supplementing effect.

Therefore, the angle between the main direction of the irradiation beams of the supplementary light source 20 and the side face of the tab portion 210 is 0° or 90°, and the setting angle of the supplementary light source 20 may be set flexibly based on the tab portion 210 to be detected, and as the supplementary light source 20 is a vertical irradiation arc-shaped light source, the brightness of the side face of the tab portion 210 may be improved.

In some embodiments, the visual detection light source 100 further includes a bracket 30, and the main light source 10 and the supplementary light source 20 are movably disposed on the bracket 30.

Specifically, the bracket 30 may be provided with adjustment holes, and the main light source 10 and the supplementary light source 20 are connected to the bracket 30 through the corresponding adjustment holes, so that the main light source 10 and the supplementary light source 20 may be moved on the bracket 30 along the adjustment holes so as to adjust the working distance of the light sources. It may be understood that the main light source 10 and the supplementary light source 20 may be adjusted along at least one of the horizontal direction and the vertical direction.

By adoption of the above technical solution, the main light source 10 and the supplementary light source 20 are movably disposed on the bracket 30, so that the working distance of the main light source 10 and the supplementary light source 20 is conveniently adjusted to adapt to the detection requirements of cells 200 of different sizes.

Figure 12:
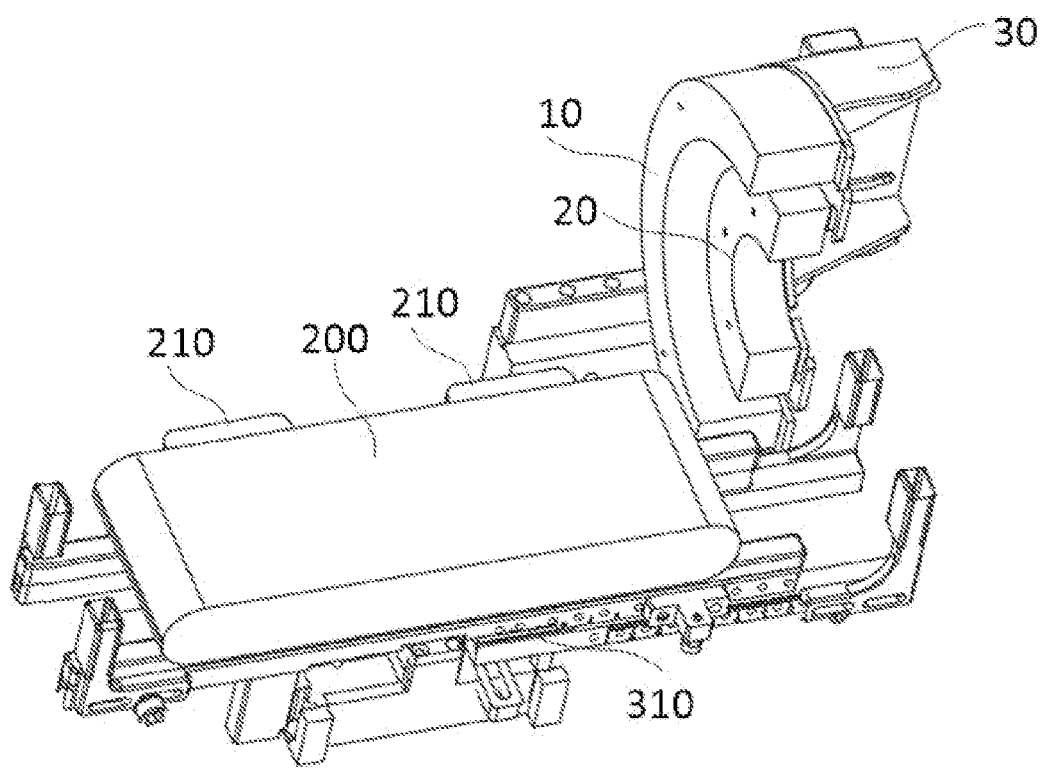
FIG. 12 is a schematic structural diagram of a visual detection light source and a cell according to another embodiment of this application.
Figure 13:
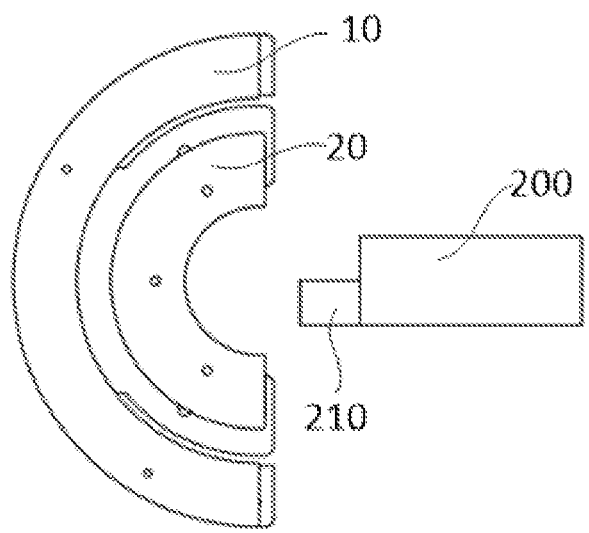
FIG. 13 is a side view of the visual detection light source and the cell shown in FIG. 12.
Figure 14:
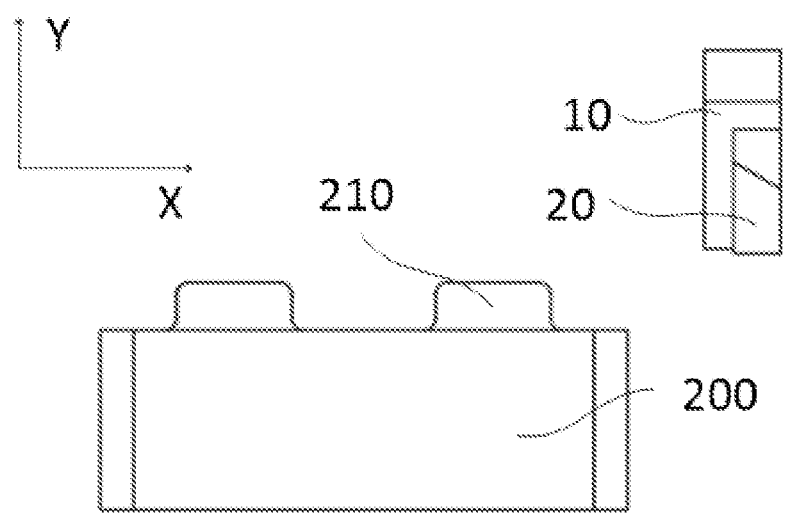
FIG. 14 is a top view of the visual detection light source and the cell shown in FIG. 12.

Referring to FIG. 12 to FIG. 14, another embodiment of this application provides a visual detection light source 100. The visual detection light source includes a main light source 10 and a supplementary light source 20. The main light source 10 and the supplementary light source 20 are arc-shaped light sources. The main light source 10 and the supplementary light source 20 are disposed concentrically, and the main light source 10 is disposed outside the supplementary light source 20. The main light source 10 is configured to irradiate a side face of a tab portion 210 at an inclined irradiation angle, the inclined irradiation angle referring to an angle formed between a main direction of irradiation beams and a detected surface. The supplementary light source 20 is configured to vertically irradiate the side face of the tab portion 210.

In this embodiment, the visual detection light source 100 is configured to provide illumination for an outer side face of the tab portion 210. Since there is a large layout space on an outer side of the tab portion 210, in order to facilitate detection, a cell 200 is placed horizontally, the visual detection light source 100 is placed vertically and faces toward the outer side of the tab portion 210, inner arcs of the main light source 10 and the supplementary light source 20 face toward the cell 200, and a first light emitting surface 101 and a second light emitting surface 201 face toward the outer side face of the tab portion 210.

In this embodiment, an angle between a main direction of irradiation beams of the supplementary light source 20 and the side face of the tab portion 210 is 90°. The visual detection light source 100 according to this embodiment may be configured to detect the outer side face of the tab portion 210 and may also adapt to the detection requirements of multilayer tabs, and the detection effect is improved.

Figure 15:
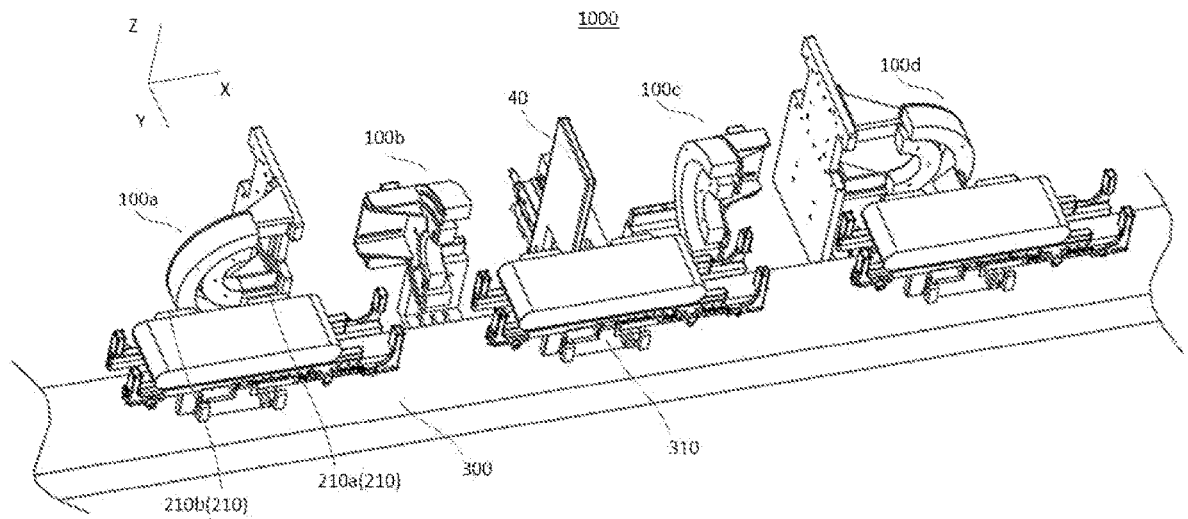
FIG. 15 is a schematic structural diagram of tab detection equipment according to an embodiment of this application.
Figure 16:
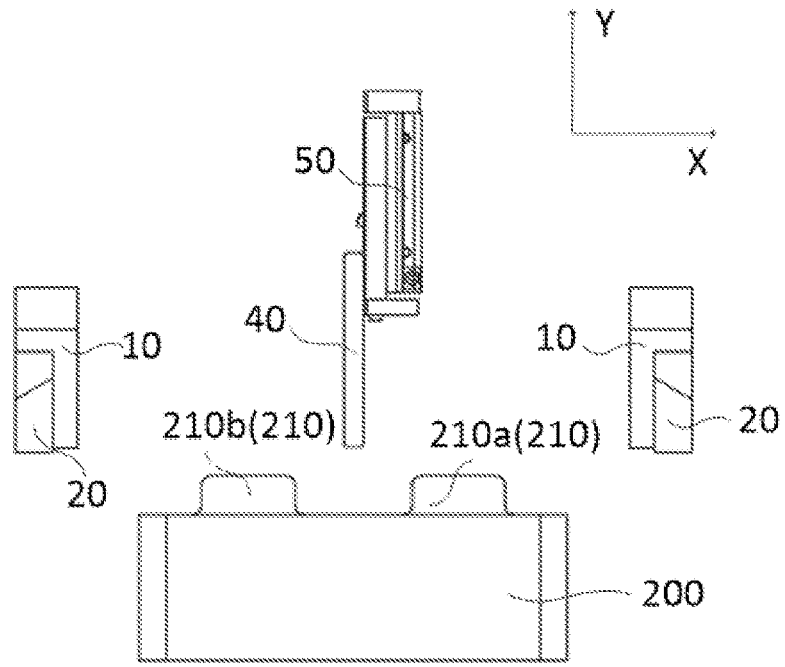
FIG. 16 is a top view of a second visual detection light source and a third visual detection light source in the tab detection equipment shown in FIG. 15 and a cell.
Figure 17:
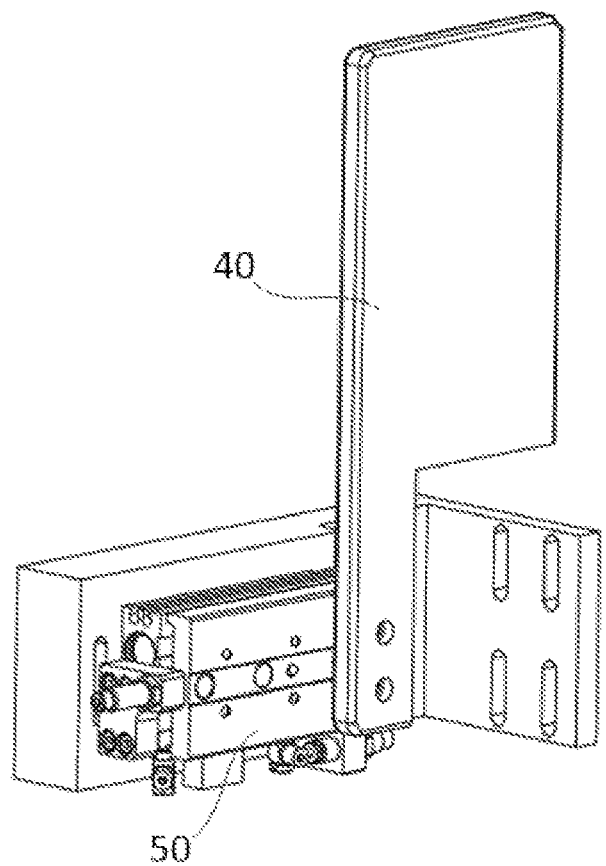
FIG. 17 is a schematic three-dimensional diagram of a light shading plate and a drive member in the tab detection equipment shown in FIG. 15.

Referring to FIG. 15, a second aspect of this application provides tab detection equipment 1000 configured to detect a first tab portion 210a and a second tab portion 210b on a cell 200. The tab detection equipment 1000 includes a first visual detection light source 100a, a second visual detection light source 100b, a fourth visual detection light source 100c, and a fourth visual detection light source 100d which are spaced apart.

The first visual detection light source 100a is configured to irradiate an inner side face of the first tab portion 210a; the second visual detection light source 100b is configured to irradiate an outer side face of the second tab portion 210b; the third visual detection light source 100c is configured to irradiate an outer side face of the first tab portion 210a; and the fourth visual detection light source 100d is configured to irradiate an inner side face of the second tab portion 210b.

At least one of the first visual detection light source 100a, the second visual detection light source 100b, the third visual detection light source 100c and the fourth visual detection light source 100d is the visual detection light source 100 in the first aspect.

The above-mentioned tab detection equipment 1000 includes the four visual detection light sources 100 to irradiate the inner side faces and the outer side faces of the two tab portions 210 respectively, so that the tab detection equipment 1000 may comprehensively detect whether the two tab portions 210 have defects. Based on the advantages of the visual detection light sources 100 provided in the first aspect, the tab detection equipment may also be applicable to the requirements of detecting multilayer tabs, and the defection effect is improved.

In some embodiments, the first tab portion 210a and the second tab portion 210b are placed horizontally and are spaced along a first direction X, and main light sources 10 and supplementary light sources 20 are placed along a vertical direction.

Specifically, the main light sources 10 and the supplementary light sources 20 are disposed along the vertical direction, that is, first light emitting surfaces 101 of the main light sources 10 and second light emitting surfaces 201 of the supplementary light sources 20 are perpendicular to a horizontal plane.

By adoption of the above technical solution, the main light sources 10 and the supplementary light sources 20 may face toward the side faces of the tab portions 210, and it is convenient to dispose a visual camera above the tab portions 210 along the vertical direction.

In some embodiments, the light emitting surfaces of the supplementary light sources 20 in the first visual detection light source 100a and the fourth visual detection light source 100d are disposed along the first direction X and the vertical direction Z; and the light emitting surfaces of the supplementary light sources 20 in the second visual detection light source 100b and the third visual detection light source 100c are disposed along a second direction Y and the vertical direction Z, the second direction Y being perpendicular to the first direction X.

The first visual detection light source 100a and the fourth visual detection light source 100d are configured to detect the inner side face of the first tab portion 210a and the inner side face of the second tab portion 210b respectively. Because a distance between the two tab portions 210 is small, it is not convenient to dispose the light sources between the two tab portions 210, so the first visual detection light source 100a and the fourth visual detection light source 100d are disposed on sides, facing away from the cell, of the tab portions 210. In the first visual detection light source 100a and the fourth visual detection light source 100d, the light emitting surfaces (i.e., the second light emitting surfaces 201) of the supplementary light sources 20 are disposed along the first direction X and the vertical direction Z, so that angles between a main direction of irradiation beams of the supplementary light sources 20 and the side faces of the tab portions 210 are 0°; and the light emitting surfaces of the main light sources 10 are inclined relative to the first direction X.

The second visual detection light source 100b and the third visual detection light source 100c are configured to detect the outer side face of the second tab portion 210b and the outer side face of the first tab portion 210a respectively, and it is convenient to dispose the first visual detection light source 100a and the fourth visual detection light source 100d on outer sides of the tab portions 210. In the second visual detection light source 100b and the third visual detection light source 100c, the light emitting surfaces (i.e., the second light emitting surfaces 201) of the supplementary light sources 20 are disposed along the second direction Y and the vertical direction, so that angles between a main direction of irradiation beams of the supplementary light sources 20 and the side faces of the tab portions 210 are 90°; and the light emitting surfaces of the main light sources 10 are inclined relative to the second direction Y.

By adoption of the above technical solution, the angles between the main direction of the irradiation beams of the supplementary light sources 20 and the side faces of the tab portions 210 are 0° or 90° to adapt to the different side faces of the tab portions 210.

In some embodiments, the first visual detection light source 100a and the fourth visual detection light source 100d are disposed in a mirroring manner, and the second visual detection light source 100b and the third visual detection light source 100c are disposed in a mirroring manner.

Specifically, the first visual detection light source 100a, the second visual detection light source 100b, the third visual detection light source 100c, and the fourth visual detection light source 100d are disposed in sequence and arranged in a line, so that the first visual detection light source 100a and the fourth visual detection light source 100d are disposed in the mirroring manner, and the second visual detection light source 100b and the third visual detection light source 100c are disposed in the mirroring manner.

It may be understood that in other embodiments, the four visual detection light sources 100 may also be arranged in other orders, and/or the four visual detection light sources 100 are arranged in a ring or other shape.

In some embodiments, the visual detection light source mechanism 100 further includes a light shading plate 40. The light shading plate 40 is disposed between the second visual detection light source 100b and the third visual detection light source 100c. The light shading plate 40 is a non-transparent plate.

The light shading plate 40 may be disposed along the vertical direction, and the light shading plate 40 corresponds to a position between the two tab portions 210.

Since the second visual detection light source 100b and the third visual detection light source 100c are disposed in the mirroring manner, by disposing the light shading plate 40 between the second visual detection light source 100b and the third visual detection light source 100c, mutual interference between the two light sources may be avoided, the second visual detection light source 100b and the third visual detection light source 100c may perform illumination simultaneously, and the detection efficiency is improved.

In some embodiments, the light shading plate 40 is a non-transparent plate subjected to matte black treatment.

Since the light shading plate 40 is subjected to the matte black treatment, the light shading plate 40 may not only shade light, but also avoid light reflection, thereby preventing an imaging effect of the visual camera from being affected by reflected light.

In some embodiments, the visual detection light source mechanism 100 further includes a drive member 50 connected to the light shading plate 40. The drive member 50 is configured to drive the light shading plate 40 to move along the second direction Y.

The drive member 50 may be an air cylinder, but is not limited thereto, and may also be a ball screw or other drive members.

Since the second visual detection light source 100b and the third visual detection light source 100c may perform detection simultaneously, the movable light shading plate 40 is provided in the embodiment of this application in order to avoid mutual interference between the two visual detection light sources 100. During detection, the light shading plate 40 is placed to a position between the second visual detection light source 100b and the third visual detection light source 100c through the drive member 50 to avoid mutual interference and influence on the imaging quality. After detection, the light shading plate 40 is removed from the position between the second visual detection light source 100b and the third visual detection light source 100c through the drive member 50 to avoid obstructing conveying of the cell 200.

In some embodiments, the tab detection equipment further includes a conveying mechanism 300 and a plurality of cell positioning tables 310 disposed on the conveying mechanism 300. The conveying mechanism 300 is configured to convey the cell positioning tables 210 to allow the cell positioning tables 310 to pass through the first visual detection light source 100a, the second visual detection light source 100b, the third visual detection light source 100c and the fourth visual detection light source 100d in sequence.

The conveying mechanism 300 may be a conveying belt, a conveying chain, a turntable, etc. The type of the conveying mechanism 300 is not limited by this application.

The cells 200 are disposed on the conveying mechanism 300 through the cell positioning tables 310, so that the conveying mechanism 300 may drive the cell positioning tables 310 and the cells 200 to move, and the cells 200 pass through the four visual detection light sources in sequence for detection of the inner side faces and the outer side faces of the first tab portion 210a and the second tab portion 210b. Thus, whether tabs are folded, turned, torn or the like is detected, a staggering condition and flatness of multilayer tabs are detected, and the detection efficiency is improved.

The tab detection equipment 1000 further includes the visual camera (not shown). Optionally, the first visual detection light source 100a, the second visual detection light source 100b, the third visual detection light source 100c, and the fourth visual detection light source 100d are each used with a visual camera. The tab detection equipment 1000 may further include a plurality of prisms (not shown). Each of the prisms is configured to reflect light from the side faces of the tab portions 210 onto the visual cameras.

Finally, it is to be noted that: the above embodiments are merely illustrative of the technical solutions of this application, rather than limiting the same; although this application has been described in detail with reference to the foregoing embodiments, a person of ordinary skill in the art will appreciate that: the technical solutions disclosed in the above-mentioned embodiments may still be modified, or some or all of the technical features thereof may be replaced by equivalents; however, these modifications or substitutions do not bring the essence of the corresponding technical solutions out of the scope of the technical solutions of the various embodiments of this application, and they should be covered by the claims and the specification of this application. In particular, the technical features mentioned in the various embodiments may be combined in any manner as long as there is no structural conflict. This application is not limited to the particular embodiments disclosed herein, but includes all technical solutions falling within the scope of the claims.

What is claimed is:

1. A visual detection light source configured to irradiate a side face of a tab portion, characterized in that the visual detection light source comprises a main light source and a supplementary light source, the main light source and the supplementary light source are arc-shaped light sources, the main light source and the supplementary light source are disposed concentrically, and the main light source is disposed outside the supplementary light source; the main light source is configured to irradiate the side face of the tab portion at an inclined irradiation angle, the inclined irradiation angle referring to an angle formed between a main direction of irradiation beams and a detected surface; and the supplementary light source is configured to vertically irradiate the side face of the tab portion.

2. The visual detection light source according to claim 1, wherein the inclined irradiation angle of the main light source ranges from 15° to 45°.

3. The visual detection light source according to claim 2, wherein the inclined irradiation angle of the main light source is 30°.

4. The visual detection light source according to claim 1, wherein the main light source comprises a first light holder, a first light-transmitting plate, and a plurality of first light beads, the first light-transmitting plate is assembled on the first light holder, the first light beads are disposed between the first light holder and the first light-transmitting plate, and the first light-transmitting plate is inclined inwards relative to the first light holder.

5. The visual detection light source according to claim 1, wherein an angle between a main direction of irradiation beams of the supplementary light source and the side face of the tab portion is 0° or 90°.

6. The visual detection light source according to claim 5, wherein the supplementary light source comprises a second light holder, a second light-transmitting plate, and a plurality of second light beads, the second light-transmitting plate is assembled on the second light holder, the second light beads are disposed between the second light holder and the second light-transmitting plate, and the second light-transmitting plate is parallel to a rear cover surface of the second light holder.

7. The visual detection light source according to claim 1, further comprising a bracket, the main light source and the supplementary light source being movably disposed on the bracket.

8. Tab detection equipment configured to detect a first tab portion and a second tab portion on a cell, comprising:
    a first visual detection light source, configured to irradiate an inner side face of the first tab portion;
    a second visual detection light source, configured to irradiate an outer side face of the second tab portion;
    a third visual detection light source, configured to irradiate an outer side face of the first tab portion; and
    a fourth visual detection light source, configured to irradiate an inner side face of the second tab portion, wherein
    the first visual detection light source, the second visual detection light source, the third visual detection light source and the fourth visual detection light source are spaced apart; wherein at least one of the first visual detection light source, the second visual detection light source, the third visual detection light source and the fourth visual detection light source is the visual detection light source according to claim 1.

9. The tab detection equipment according to claim 8, wherein the first tab portion and the second tab portion are horizontally disposed and spaced apart along a first direction, and the main light source and the supplementary light source are disposed along a vertical direction.

10. The tab detection equipment according to claim 9, wherein light emitting surfaces of the supplementary light source in the first visual detection light source and the fourth visual detection light source are disposed along the first direction and the vertical direction; and
    light emitting surfaces of the supplementary light source in the second visual detection light source and the third visual detection light source are disposed along a second direction and the vertical direction, the second direction being perpendicular to the first direction.

11. The tab detection equipment according to claim 10, wherein the first visual detection light source and the fourth visual detection light source are disposed in a mirroring manner, and the second visual detection light source and the third visual detection light source are disposed in a mirroring manner.

12. The tab detection equipment according to claim 10, wherein a visual detection light source mechanism further comprises a light shading plate disposed between the second visual detection light source and the third visual detection light source, and the light shading plate is a non-transparent plate.

13. The tab detection equipment according to claim 12, wherein the light shading plate is a non-transparent plate subjected to matte black treatment.

14. The tab detection equipment according to claim 12, wherein the visual detection light source mechanism further comprises a drive member connected to the light shading plate, and the drive member is configured to drive the light shading plate to move along the second direction.

15. The tab detection equipment according to claim 8, further comprising a conveying mechanism and a plurality of cell positioning tables disposed on the conveying mechanism, the conveying mechanism being configured to convey the cell positioning tables to allow the cell positioning tables to pass through the first visual detection light source, the second visual detection light source, the third visual detection light source and the fourth visual detection light source in sequence.

* * * * *